US012565305B2

(12) United States Patent (10) Patent No.: US 12,565,305 B2

Family et al. (45) Date of Patent: Mar. 3, 2026

(54) AIRCRAFT WING WITH A WING TIP DEVICE

(71) Applicant: Airbus Operations Limited, Filton (GB)

(72) Inventors: Oliver Family, Filton (GB); Keith Agmen, Filton (GB); James Kirk, Filton (GB); Robert Mills, Filton (GB); Thomas Wilson, Filton (GB)

(73) Assignee: AIRBUS OPERATIONS LIMITED, Filton (GB)

( * ) Notice: Subject to any disclaimer, the term of this patent is extended or adjusted under 35 U.S.C. 154(b) by 0 days.

(21) Appl. No.: 18/987,937

(22) Filed: Dec. 19, 2024

(65) Prior Publication Data

US 2025/0206436 A1 Jun. 26, 2025

(30) Foreign Application Priority Data

Dec. 22, 2023 (GB) ...................................... 2319976

(51) Int. Cl.
B64C 3/56 (2006.01)

(52) U.S. Cl.
CPC ..................................... B64C 3/56 (2013.01)

(58) Field of Classification Search
CPC .................................. B64C 3/56; B64C 3/546
See application file for complete search history.

(56) References Cited

U.S. PATENT DOCUMENTS

| | | |
|---|---|---|
| 11,203,410 B2 | 12/2021 | Wilson et al. |
| 11,518,500 B2 | 12/2022 | Good et al. |

| | | | |
|---|---|---|---|
| 2019/0002083 A1 | 1/2019 | Wilson et al. | |
| 2019/0322351 A1 | 10/2019 | Lorenz | |
| 2019/0322355 A1* | 10/2019 | Wilson | ................... B64C 9/146 |
| 2020/0130816 A1* | 4/2020 | O'Rourke | ............... B64C 3/546 |

(Continued)

FOREIGN PATENT DOCUMENTS

| | | |
|---|---|---|
| CN | 203740126 U | 7/2014 |
| CN | 112249302 A | 1/2021 |

(Continued)

OTHER PUBLICATIONS

UK Patent Office Search Report from GB priority application No. 2319976.3 dated Dec. 18, 2024.

*Primary Examiner* — Rodney A Bonnette

(74) *Attorney, Agent, or Firm* — Greer, Burns & Crain, Ltd.

(57) ABSTRACT

An aircraft including a wing with a fixed wing portion and a wing tip device rotatably hingedly attached at a fixed wing portion outboard end. The wing includes a wing fold mechanism configured to actuate the wing tip device to rotate relative to the fixed wing portion to at least three commanded and predetermined wing fold angles and to restrain rotational movement of the wing tip device at each commanded position. A first position corresponds to high-speed flying, a second position to ground-based operations and a third position to low-speed flying. The flying positions rotate the wing tip to a position where upper and lower wing tip surfaces are continuations of the upper and lower surfaces of the fixed wing, with a low-speed incidence angle being less than a high-speed incidence angle. The ground-based position reduces the wing span to the greatest degree of the three positions.

11 Claims, 5 Drawing Sheets

(56) References Cited

U.S. PATENT DOCUMENTS

| | | | |
|---|---|---|---|
| 2020/0172227 A1* | 6/2020 | Way | B64C 3/48 |
| 2020/0207461 A1* | 7/2020 | Dussart | B64C 3/546 |
| 2020/0208687 A1* | 7/2020 | Dussart | B64C 3/56 |
| 2024/0253765 A1 | 8/2024 | Habchi et al. | |

FOREIGN PATENT DOCUMENTS

| | | |
|---|---|---|
| CN | 112606995 A | 4/2021 |
| GB | 2628524 A | 10/2024 |

* cited by examiner

POSITION A

POSITION C

POSITION D

AIRCRAFT WING WITH A WING TIP DEVICE

CROSS-REFERENCES TO RELATED APPLICATIONS

This application claims the benefit of Great Britain Patent Application Number 2319976.3 filed on Dec. 22, 2023, the entire disclosure of which is incorporated herein by way of reference.

FIELD OF THE INVENTION

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage). To address this problem, various arrangements comprising moveable wing tip devices, that specifically enable the span to be reduced in a ground configuration, have been suggested.

BACKGROUND OF THE INVENTION

A design challenge is to arrive at an optimal wing configuration that balances weight, complexity, operating reliability, manufacturability, and cost with the required level of aerodynamic performance and handling characteristics necessary for both low speed flight i.e., during the take-off, initial climb, final approach and landing, and high-speed flight i.e., during the extended climb, descent and normal cruise stages of flight of the aircraft.

An important aerodynamic consideration is the incidence angle setting at wing chord sections across the entire wing, and, in particular, at the outboard wing section. This contributes significantly to the expected wing loading present at the wing chord sections and the distribution of the loading across the wing, during phases of flight. It follows that for a given section, the incidence angle setting also determines the point at which the flow over that wing section starts to deteriorate, resulting in a growing reduction in lift and predictability of the flow, and in an increase in drag. This is a particular consideration to aircraft designers for low-speed flight configurations of the aircraft where the effect of lift loss at the outboard portions of the wing is carefully considered to ensure adequate performance and handling characteristic margins are maintained during low-speed phases of flight as mentioned.

In the context of aircraft with movable wing tip devices, state of the art solutions to ensure adequate margin at the outboard end of the wing include the implementation of leading edge or trailing devices such as slats, flaperons, or flow control devices on the movable wing tip device. Among other things, such solutions negatively impact the design outcome by increasing weight, complexity, and cost. Other solutions include selection of wing chord section shapes for the wing tip device that improve low speed margin but sacrifice lift and draft performance during higher speed phases of flight such as during cruise, however such a solution also negatively impacts the design outcome by reducing aerodynamic performance of the aircraft. This increases fuel burn for the operator.

SUMMARY OF THE INVENTION

According to a first aspect of the invention, there is provided an aircraft comprising a wing, the wing having a fixed wing portion and a wing tip device that is rotatably attached about a hinge axis to the fixed wing portion at an outboard end, wherein the hinge axis is orientated at an acute angle H relative to the aircraft axis X;

the wing further comprising at least one wing fold actuation and restraining mechanism configured to actuate the wing tip device such that it rotates relative to the fixed wing portion about the hinge axis to predetermined wing fold angles ($\theta$) corresponding to one of at least three commanded positions (A, B, C) and to restrain movement of the wing tip device (9) relative to the fixed wing portion at each commanded position (A, B, C), wherein the first position (A) corresponds to high-speed flying configuration of the aircraft for which the wing tip device is rotated about the hinge axis to a predetermined wing fold angle ($\theta$) and then held such that the upper and lower surfaces of the wing tip device are continuations of the upper and lower surfaces of the fixed wing (103), and the wing tip device comprises a first incidence angle ($\varepsilon 1$); wherein a second position (B) corresponds to a ground configuration of the aircraft for use during ground-based operations, for which the wing tip device is rotated about the hinge axis to a predetermined wing fold angle ($\theta$) and then held such that the span of the aircraft wing is reduced the most; and finally wherein a third position (C) corresponds to a low speed flying configuration of the aircraft for which the wing tip device is rotated about the hinge axis to a predetermined wing fold angle ($\theta$) and then held such that the wing tip device) comprises a second incidence angle ($\varepsilon 2$) that is less than the first incidence angle ($\varepsilon 1$). Such a design is optimal for both low speed and high-speed configurations, without incurring the negative aspects seen by the solutions of the prior art.

The angle H is preferably between 10 and 35 degrees, and more preferably approximately 13.5 degrees.

For the third position C, the predetermined wing fold angle ($\theta$) is preferably approximately 20 degrees.

A further fourth position (D) may further be provided, wherein the fourth position (D) corresponds to a further low speed flying configuration of the aircraft for which the wing tip device is rotated about the hinge axis to a predetermined wing fold angle ($\theta$) and then held such that the wing tip device comprises a third incidence angle ($\varepsilon 3$) that is less than the second incidence angle ($\varepsilon 2$).

The sweep angle of the fixed wing portion may be less than the sweep angle of the tip. In addition, the commanded positions (A, B, C) may correspond to commanded positions of wing high lift devices.

The high lift devices may be wing flaps, and may operate to flap positions of 5, 10 and 25 degrees. The high lift devices may be wing slats, and may operate to positions of 5, 10 and 25 degrees. The span length of the wing tip device (105) may be between 5% and 15% of the overall span (b) length of the aircraft (1), and preferably may be 10%.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will be appreciated that any features described with reference to one aspect of the invention are equally applicable to any other aspect of the invention, and vice versa.

BRIEF DESCRIPTION OF THE DRAWINGS

Embodiments of the present invention will now be described by way of example only with reference to the accompanying schematic drawings of which.

DETAILED DESCRIPTION OF THE PREFERRED EMBODIMENTS

Figures 1A, 1B:
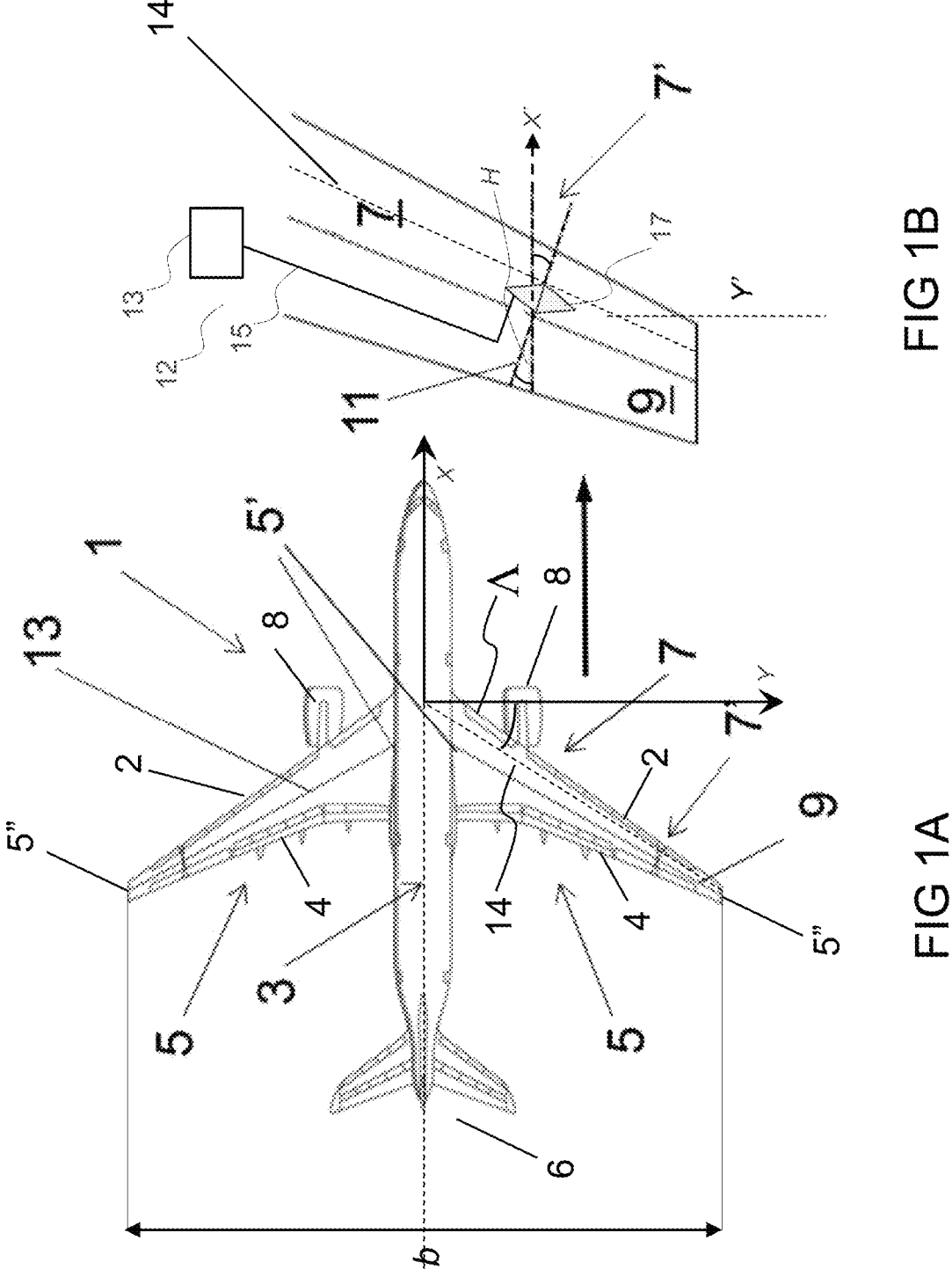
FIG. 1A shows a plan projection view of an aircraft according to an embodiment of the invention.
FIG. 1B shows a close-up view of the tip of the wing of the aircraft in FIG. 1A.

Referring to FIG. 1A and FIG. 1B, shown is a plan view of an aircraft 1 and a section of the wing 5 according to an embodiment of the invention. The aircraft 1 comprises a central fuselage 3, two main wings 5, a tail 6, and a pair of wing mounted jet engines 8. The aircraft 1 has a set of orthogonal aircraft axes X, Y, and Z (shown in FIG. 2). The longitudinal aircraft axis X has its origin at the center of gravity of the aircraft 1 and extends lengthwise through the fuselage 3. The lateral aircraft axis Y (or spanwise axis) shares the same origin, and extends laterally, orthogonal to the longitudinal axis X in the direction indicated. Finally, the vertical or normal axis Z again shares the same origin and extends vertically, orthogonal to both the longitudinal axis X and the lateral axis Y in the direction indicated. Each wing 5 extends outwardly from the fuselage 3 from respective wing roots 5'. Each wing 5 is swept aft at a sweep angle Λ, which is the measured angle between the mean quarter chord line 14 of the wing 5 and the aircraft lateral axis Y, as shown. Each wing 5 further comprises a fixed wing portion 7 extending from the root 5' to a fixed wing portion end 7' (shown in close up in FIG. 1B). At the fixed wing portion end 7', each wing 5 also comprises a moveable wing tip device 9, in the form of a planar wing tip extension, which further comprises a wing tip 5". The wing tip device 9 is rotatable mounted about a hinge axis 11. The hinge axis 11 is orientated at an acute angle H from an aircraft axis X. This hinge axis 11, is thus non-parallel to the line of flight direction (the line of flight direction being shown in FIG. 1b for comparison). The aircraft 1 has an overall wing spanwise length b (wing span) equal to the distance measured in the XY plane in the Y direction between a wing tip 5". The mid span distance (b/2) is where the longitudinal axis X bisects the wing spanwise length b.

Figure 2:
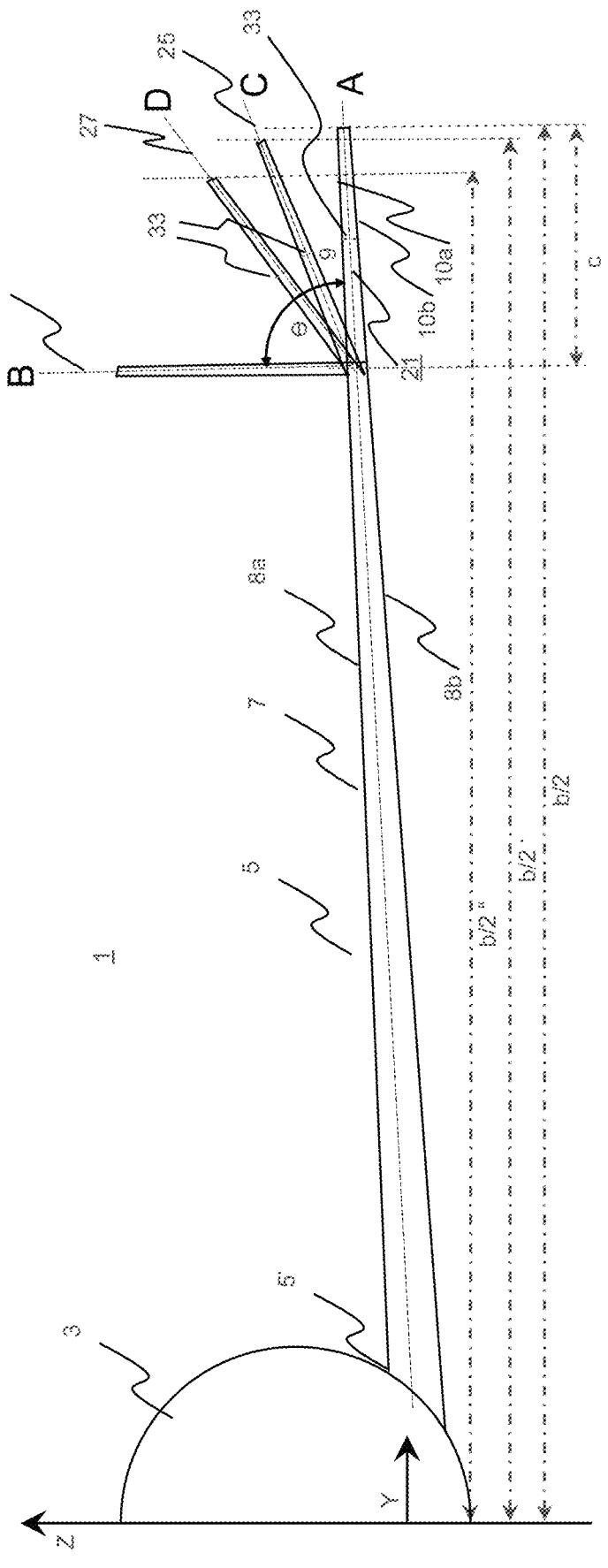
FIG. 2 shows a rear projection view of the aircraft of FIG. 1A viewed in the direction shown in FIG. 1A, with the wing tip device shown in flight positions A, C, D and in a ground operating position B.
Figure 3A:
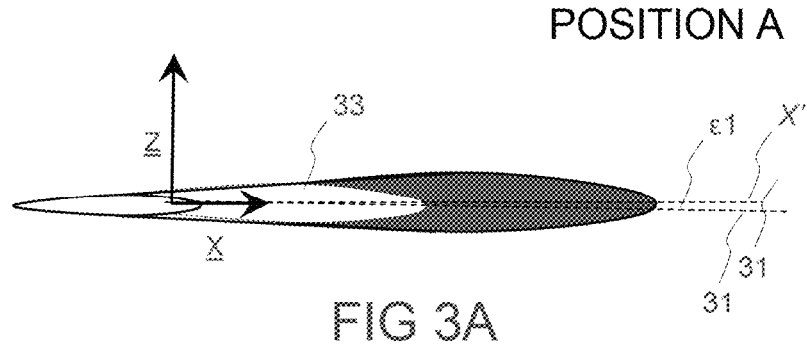
FIGS. 3A, 3B and 3C show close-up end projection views of the tip of the wing of the aircraft of FIGS. 1A, 1B, and 2, with hidden construction detail showing incidence angle of the wing tip device.
Figure 3B:
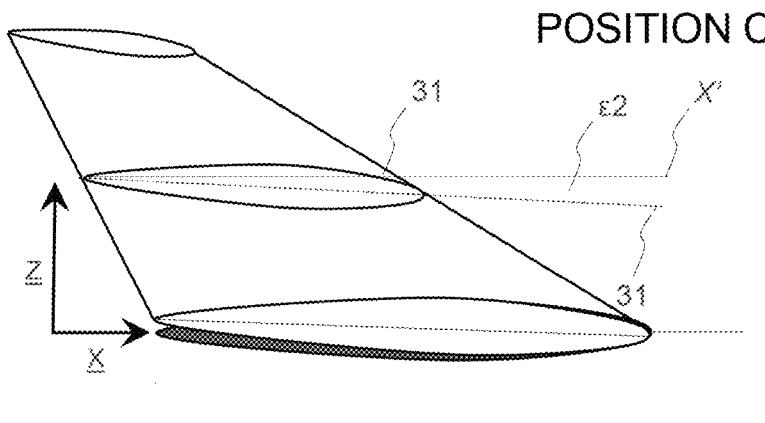
Figure 3C:
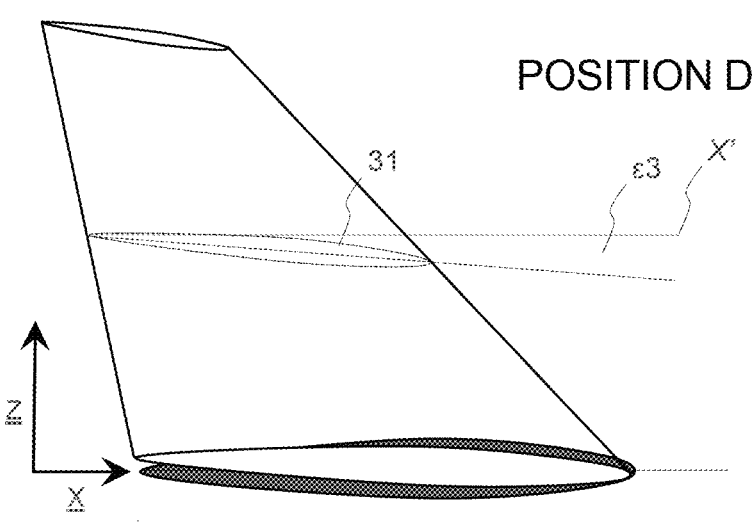

With reference to FIGS. 1A, 1B and 2, the aircraft 1 comprises a wing fold system 12, which further comprises a wing fold control computer 13 that is part of the aircraft avionics located in the fuselage 3. The control computer 13 communicates electronically via a harness 15 with a combined wing fold actuation and restraining mechanism 17 and commands the actuation and restraining function of the mechanism 17. The actuation and restraining mechanism 17 comprises a controllable hydraulic motor unit with a transmission and brake, and a locking and latching mechanism (not shown), all of which mechanically engages the fixed wing portion end 7" and the wing tip device 9. The actuation and restraining mechanism 17 is configured to (i) actuate the wing tip device 9 such that it rotates relative to the fixed wing portion 7 about the hinge axis 11 to predetermined wing fold angle (θ) corresponding to one of at least three selected positions (A, B, C) commanded by the wing fold control computer 13, and (ii), to restrain movement of the wing tip device 9 relative to the fixed wing portion at each selected position (A, B, C). In the present example a fourth optional position D is provided.

Referring now to FIGS. 2, 3A, 3B, 3C, 4 and 5, the wing tip device 9 is shown rotated and restrained in the four positions A, B, C and optional position D.

The wing tip device 9 folded to positions A, C and D corresponds to a normal flying configuration of the aircraft 1. In particular, the wing tip device 9 folded to position A corresponds to a normal cruise, higher speed, flying configuration of the aircraft 1 where the wing span length b is maximized such that the optimum aircraft performance in terms of lift/drag ratio is achieved at a normal cruise speed.

The wing tip device 9 folded to position C, and optional position D correspond to low speed, take-off, climb, landing and/approach flight configurations of the aircraft 1 where the wing half span length b/2', b/2" is reduced for both wings 5 from the maximum length b/2, such that the low-speed performance and handling characteristics are improved by reducing for each position the incidence angle (hence twist angle) at of the wing tip device 9 relative to the fixed wing portion 7.

The wing tip device 9 folded to position B corresponds to an aircraft on the ground configuration, where aerodynamic performance of the aircraft 1 is no longer relevant and where the wing span length b is reduced to a minimum such that the wing tip device 9 is held in a substantially upright position so that the aircraft may operate within the optimum gate limit achievable.

In more detail, for position A, the wing tip device 9 is an extension of the fixed wing 7. Accordingly, the upper and lower surfaces 8a, 8b, respectively of the fixed wing portion 7 are continuous with the upper and lower surfaces 10a, 10b of the wing tip device 9 (see also FIG. 3A). The leading and trailing edges of the fixed wing portion 7 are also continuous with the respective leading and trailing edges of the wing tip device 9 (see FIG. 3A). A line 21 is formed by projecting the mid plane of the fixed wing portion 7 and wing tip device 9 onto the ZY plane. For position A, the predetermined wing fold angle (θ) is equal to 0 degrees. Furthermore, for position A, as can be seen from studying FIGS. 2 and 3A, at a mid-span position (c/2) of the span length c of the wing tip device 9, a chordline 31 of a chordwise airfoil section 33 of the wing tip device 9 forms a first incidence angle (ε1) relative to an axis X', where the axis X' is parallel to the aircraft axis X. The first incidence angle (ε1) is approximately 5 degrees for position A and is substantially the same incidence angle as that of the fixed wing portion end 7'.

For position B, a line 23 is formed by projecting the mid plane of the wing tip device 9 in the folded position B onto the ZY plane. The predetermined wing fold angle (θ) for position B is equal to 90 degrees, which corresponds to the angle measured between line 21 of position A relative to line 23 for position B.

For position C, a line 25 is formed by projecting the mid plane of the wing tip device 9 in the folded position C onto the ZY plane. The predetermined wing fold angle (θ) for position C is equal to 20 degrees, which corresponds to the angle measured between line 21 of position A relative to line 25 for position C. As can also be seen from studying FIGS. 2 and 3B, at the mid-span position (c/2) of the span length c of the wing tip device 9, the chordline 31 of the chordwise airfoil section 33 of the wing tip device 9 forms a second incidence angle (ε2) relative to an axis X', where the axis X' is parallel to the aircraft axis X. The second incidence angle (ε2) is approximately 13.5 degrees for position C and is lower than that of the fixed wing portion end 7' and the first incidence angle (ε1).

Similarly, for optional position D, a line 27 is formed by projecting the mid plane of the wing tip device 9 in the folded position D onto the ZY plane. The predetermined wing fold angle (θ) for position D is equal to 35 degrees, which corresponds to the angle measured between line 21 of position A relative to line 27 for position D. As can also be seen from studying FIGS. 2 and 3B, at the mid-span position (c/2) of the span length c of the wing tip device 9, the chordline 31 of the chordwise airfoil section 33 of the wing tip device 9 forms a third incidence angle (ε3) relative to an axis X', where the axis X' is parallel to the aircraft axis X. The third incidence angle (ε3) is lower than that of the second incidence angle (ε2).

Table 1 below summarizes the wing tip device incidence angle and predetermined wing fold angle for positions A, B, C and D. It can be seen that the design is such that the incidence angle reduces as the rotation angle of the wing tip device increases. This coupling is governed by the magnitude of the acute angle H, by which the hinge axis 11 is orientated relative to the aircraft axis X. Where the acute angle H increases, the magnitude of the reduction of incidence angle increases proportionally to increasing wing fold angle.

TABLE 1

| summary of predetermined wing tip device fold angle. | | | |
|---|---|---|---|
| Posi-tion | Configuration | Predetermined wing fold angle (Θ) | Wing tip device incidence angle (ε) |
| A | Normal cruise flight Wing tip device fully extended (deployed) | 0 | 5 |
| B | Ground operations and parking - Wing tip device fully folded (retracted) | 90 | — |
| C | Low speed flight configuration 1 | 20 | 13.5 |
| D | Low speed flight configuration 2 (optional) | 35 | <13.5 |

Figure 4:
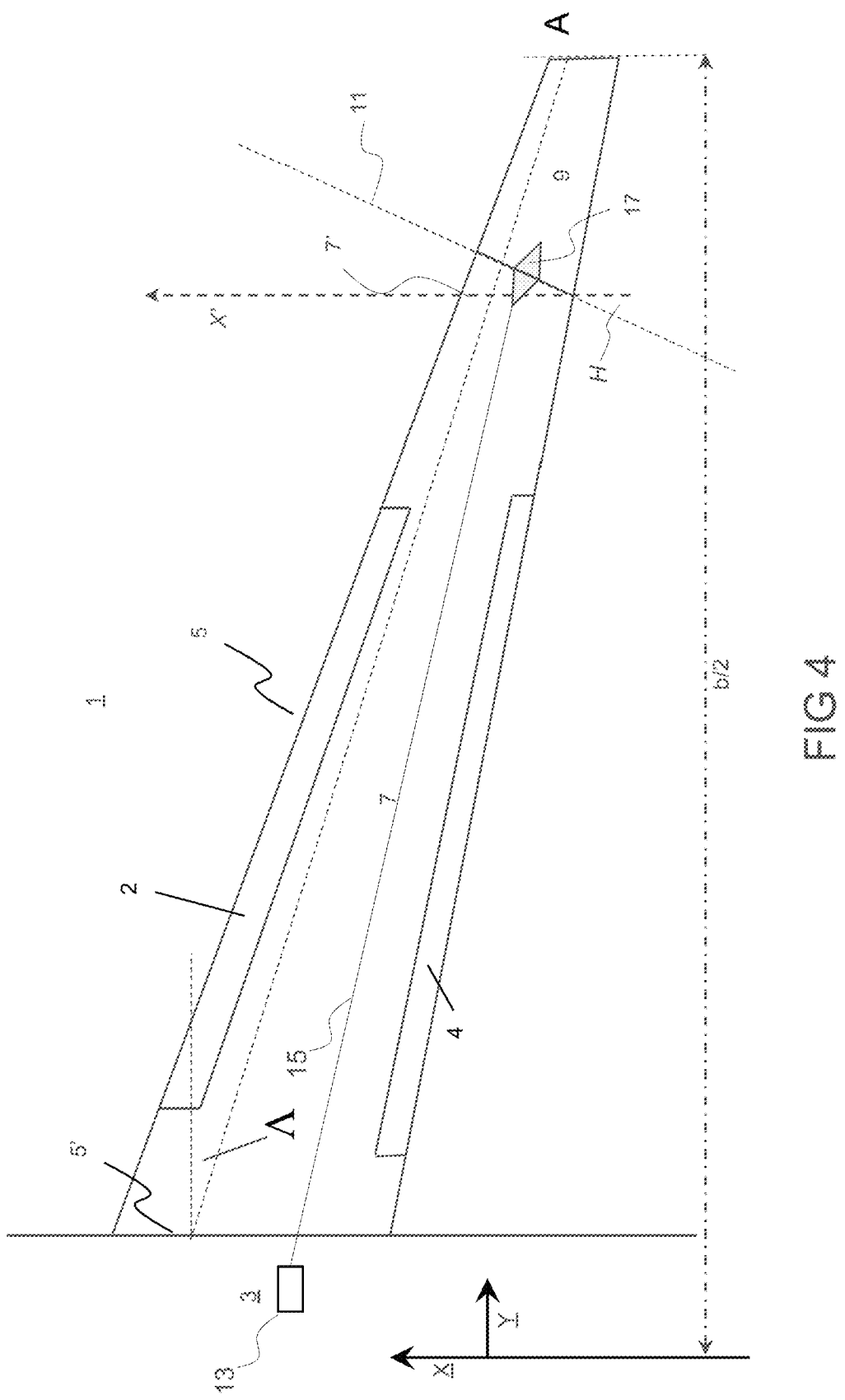
FIG. 4 is a further plan projection view of an aircraft according to an embodiment of the invention.
Figure 5:
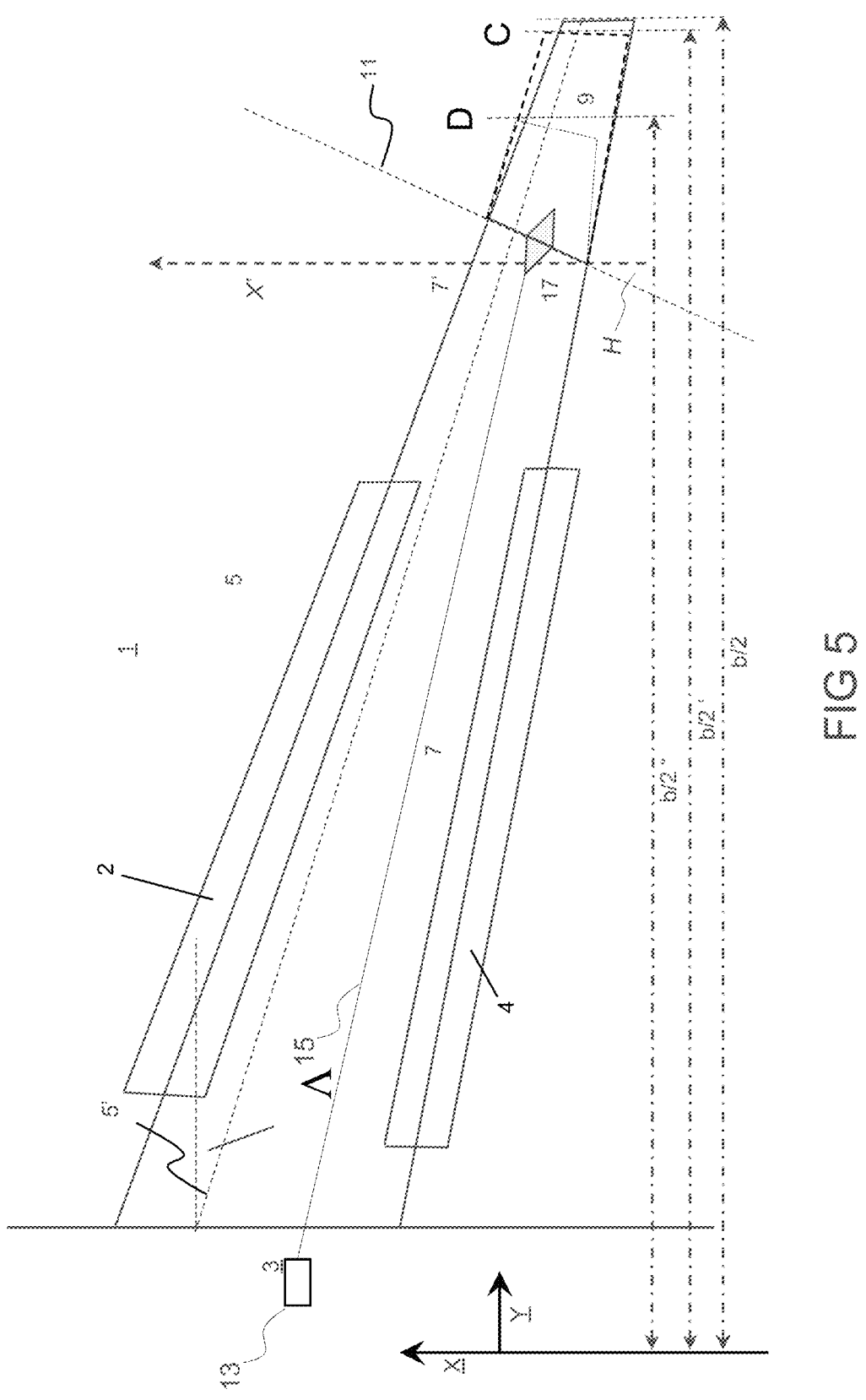
FIG. 5 is a further plan projection view of an aircraft according to an embodiment of the invention.

FIG. 4 shows the wing 5 configured with the wing tip device 9 in position A. The high lift devices in the form of at least one slat 2 and at least one flap 4 are fully retracted corresponding to this position A of the wing tip device 9. FIG. 5 shows the wing 5 configured with the wing tip device 9 in positions C and D with position A for reference. The high lift devices in the form of at least one slat 2 and at least one flap 4 are shown deployed corresponding to position C or D of the wing tip device 9. It should be appreciated that the wing 5 may alternatively have no high lift devices on either the leading edge or trailing edge of the wing 5. The sweep angle, span length, dihedral characteristics of the wing tip may vary substantially from those of the outboard wing tip portion in position A. For example, the sweep angle of the wing tip device 9 Λ' may be substantially greater than that of the adjacent fixed wing portion 7 when measured in the same way. The span length of the wing tip device 9 shown is approximately 10% of the extended overall span (b) length of the aircraft 1; but it may alternatively be between 5% and 15% of the span length b.

While the present invention has been described and illustrated with reference to particular embodiments, it will be appreciated by those of ordinary skill in the art that the invention lends itself to many different variations not specifically illustrated herein. By way of example only, in other embodiments (not shown) the wing tip device may comprises a hydraulic actuator for actuating the wing tip device between the flight and ground configurations, but it may be electric or another suitable alternative.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising a wing having a fixed wing portion and a wing tip device that is rotatably attached about a hinge axis to the fixed wing portion at an outboard end, wherein the hinge axis is orientated at an acute angle H relative to an aircraft longitudinal axis X;

the wing further comprising at least one wing fold actuation and restraining mechanism configured to actuate the wing tip device such that it rotates relative to the fixed wing portion about the hinge axis to predetermined wing fold angles θ corresponding to one of at least three commanded positions and to restrain movement of the wing tip device relative to the fixed wing portion at each commanded position wherein a first position corresponds to high-speed flying configuration of the aircraft for which the wing tip device is rotated about the hinge axis to a predetermined wing fold angle θ and then held such that the upper and lower surfaces of the wing tip device are continuations of upper and lower surfaces of the fixed wing portion, and the wing tip device comprises a first incidence angle $\varepsilon 1$;

wherein a second position corresponds to a ground configuration of the aircraft for use during ground-based operations, for which the wing tip device is rotated about the hinge axis to a predetermined wing fold angle $\theta$ and then held such that a span of the wing is reduced the most;

wherein a third position corresponds to a low speed flying configuration of the aircraft for which the wing tip device is rotated about the hinge axis to a predetermined wing fold angle $\theta$ and then held such that the wing tip device comprises a second incidence angle $\varepsilon 2$ that is less than the first incidence angle $\varepsilon 1$, wherein each of the at least three commanded positions correspond to commanded positions of wing high lift devices.

2. The aircraft of claim 1, wherein the angle H is between 10 and 35 degrees.

3. The aircraft of claim 2, wherein the angle H is 13.5 degrees.

4. The aircraft according to claim 1, wherein for the third position the predetermined wing fold angle $\theta$ is 20 degrees.

5. The aircraft according to claim 1, further comprising a fourth position wherein the fourth position corresponds to a further low speed flying configuration of the aircraft for which the wing tip device is rotated about the hinge axis to a predetermined wing fold angle $\theta$ and then held such that the wing tip device comprises a third incidence angle $\varepsilon 3$ that is less than the second incidence angle $\varepsilon 2$.

6. The aircraft according to claim 1, wherein a sweep angle of the fixed wing portion is less than a sweep angle of the wing tip device.

7. The aircraft according to claim 1, wherein high lift devices are wing flaps.

8. The aircraft according to claim 7, wherein a selection of flap positions is 5, 10 and 25 degrees.

9. The aircraft according to claim 1, wherein the wing high lift devices are wing slats.

10. The aircraft according to claim 9, wherein a selection of slat positions is 5, 10 and 25 degrees.

11. The aircraft according to claim 1, wherein a span length of the wing tip device is between 5% and 15% of an overall span length of the aircraft.

* * * * *